United States Patent [19]
Yale

[11] 3,927,093
[45] Dec. 16, 1975

[54] 2-(O-AMINOPHENYLTHIO)BENZYL ALCOHOLS

[75] Inventor: Harry Louis Yale, New Brunswick, N.J.

[73] Assignee: E. R. Squibb & Sons, Inc., Princeton, N.J.

[22] Filed: Sept. 30, 1974

[21] Appl. No.: 510,856

Related U.S. Application Data

[63] Continuation of Ser. No. 296,508, Oct. 10, 1972, abandoned.

[52] U.S. Cl. ............ 260/571; 260/470; 260/473 S; 260/476 R; 260/501.18; 260/501.19; 260/556 B; 260/578; 424/316; 424/324; 424/330
[51] Int. Cl.² ........................................ C07C 91/40
[58] Field of Search .......... 260/571, 501.18, 501.19

[56] References Cited
UNITED STATES PATENTS
3,450,698   6/1969   Farge et al. .................... 260/571 X

OTHER PUBLICATIONS

Profira et al., "Chemical Abstracts," Vol. 72, pp. 330, Section 12607c (1970).

Burger et al., "Journal of Organic Chemistry," Vol. 19, pp. 1841–1846, (1954).

*Primary Examiner*—R. V. Hines
*Attorney, Agent, or Firm*—Lawrence S. Levinson; Merle J. Smith; Stephen B. Davis

[57]   ABSTRACT

2-(o-Aminophenylthio)benzyl alcohol and derivatives thereof and their methods of preparation are disclosed. In addition, pharmaceutical compositions containing said compounds and methods for using said compositions in the treatment of inflammation and as antimicrobials are reported.

3 Claims, No Drawings

2-(O-AMINOPHENYLTHIO)BENZYL ALCOHOLS

This is a continuation of application Ser. No. 296,508, filed Oct. 10, 1972, and now abandoned.

This invention relates to compounds of the formula:

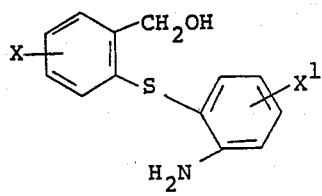

I wherein X and $X^1$ are selected from the group consisting of hydrogen, halogen, trifluoromethyl, lower alkyl, lower alkoxy, lower alkylthio, diloweralkylsulfamoyl, mono lower alkylsulfamoyl, sulfamoyl and aryl and their pharmaceutically acceptable acid addition salts.

In addition, this invention encompasses the methods for preparing said compounds, the pharmaceutical compositions and methods for using said compositions as antiinflammatory and antimicrobial agents.

The term "lower alkyl" is intended to mean a straight or branched hydrocarbon fragment of from 1 to 6 carbon atoms.

The term "lower alkoxy" is intended to mean a straight or branched hydrocarbon fragment of from 1 to 6 carbon atoms linked to the remainder of the molecule through an oxygen atom.

The term "lower alkylthio" is intended to mean a straight or branched chain hydrocarbon fragment of from 1 to 6 carbon atoms linked to the remainder of the molecule through a sulfur atom.

The term "aryl" is intended to mean phenyl or naphthyl wherein said phenyl or naphthyl may or may not be substituted with one or two groups, such as lower alkyl, lower alkoxy, halogen and dilower alkylamino.

The term "pharmaceutically acceptable acid addition salts" is intended to encompass salts, such as hydrochlorides, sulfates, phosphates, acetates, citrates, tartrates, fumarates, maleates, pamoates, etc.

The preferred compounds of this invention are those wherein X is H, Cl, or $CH_3O$ and $X^1$ is Cl or $Cf_3$ with the most preferred being where X is H and $X^1$ is Cl.

The compounds of this invention are prepared by the following reaction sequence:

described and Z is chlorine or bromine.

The known compounds of the type II are prepared by the procedures described in *J. Org. Chem.* 19, 599(1954); *J. Pharm. Soc. Japan*, 74, 358(1954); *J. Sci Ind. Research* (India), 118,35 (1952), while the known compounds of the type III are synthesized according to the procedures shown in U.S. Pat. No. 2,454,260, all of which are incorporated by reference.

The reaction of II with III to give the starting material IV is generally carried in an organic solvent in the presence of a base, such as ethanol and sodium methoxide, dimethylformamide and potassium carbonate and dimethylacetamide and potassium carbonate.

The compounds of this invention (I) are prepared by a reduction of compounds of the type III using a reducing reagent, such as $LiAlH_4$ or $AlH_3$, in a solvent such as diethyl ether, tetrahydrofuran or dioxane. These reactions are conducted at from about 0°C to the refluxing temperature of the solvent for periods of from a few minutes to about one hour. After completion of the reaction, water is added to give the desired product of the type I.

The compounds of this invention find utility as topical antiinflammatory and antimicrobial agents, especially in treating infections caused by *Candida albicans*, *Pasturella multocida* and *Trichophyton mentagrophytes* in mammals. The concentration of this material in a pharmaceutical vehicle may be from 0.1 to 5.0 percent, preferably from 0.5 to 2.0 percent.

Thus the compounds of this invention may be placed in ointments, creams, lotions, jellys or aerosol sprays for topical application.

In addition, to the use of standard bases such as petroleum jelly, cetyl and stearyl alcohols, propylene glycol, palmitates, stearates, parabens, etc., the pharmaceutical preparations may contain anti-oxidants, coloring ingredients and fragrances.

When preparing a lotion, aqueous aerosol spray or water miscible cream, pharmaceutically acceptable salts of compounds of the formula I are used. In non-water miscible ointments, jellys, etc., the free bases of the compounds of this invention are employed.

DETAILED DESCRIPTION

The following examples are provided for illustrative purposes and may include particular features of the invention; however, the examples should not be construed as limiting the invention, many variations of

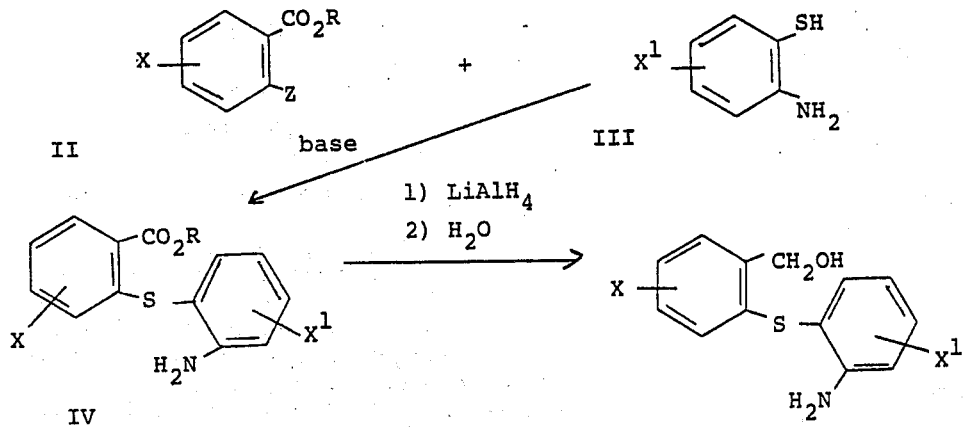

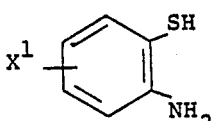

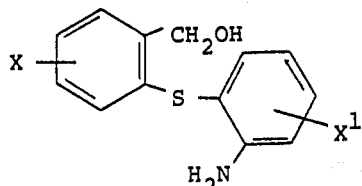

wherein R is lower alkyl, X and $X^1$ are as previously which are possible without departing from the spirit or

3

EXAMPLE 1

2-[(2-Amino-4-chlorophenyl)thio]benzyl Alcohol a. Ethyl 2-[(2-Amino-4-chlorophenyl)thio]benzoate To a nitrogen-diffused solution of 195.0 g of ethyl o-chlorobenzoate and 160.0 g of 2-amino-4-chlorobenzenethiol in 500 ml of ethanol at room temperature is added in 1 hour a solution of 68.0 g of sodium ethoxide in 1 l of ethanol. When the addition is complete, the mixture is stirred for 24 hours at room temperature; during this time a heavy precipitate of a solid occurs. The mixture is cooled by means of an ice bath, the solid filtered, dried, and recrystallized from heptane to give about 207.0 g of 2-[(2-amino-4-chlorophenyl)thio]benzoate.

b. 2-[(2-Amino-4-chlorophenyl)thio]benzyl Alcohol

The product from (a), 30.5 g, in 250 ml of dry tetrahydrofuran is added to a solution of 7.6 g of lithium aluminum hydride in 150 ml of dry tetrahydrofuran, while cooling in an ice bath. Subsequent to the addition, the mixture is heated to reflux, heated under reflux for about 10 minutes, cooled in ice, and treated dropwise with 10 ml of water. The tetrahydrofuran solution is decanted from the gelatinous mass, the gelatinous mass is extracted with three 100 ml portions of tetrahydrofuran, the combined tetrahydrofuran solutions are dried and concentrated to give about 22.7 g of 2-[(2-amino-4-chlorophenyl)thio]benzyl alcohol, mp about 112°–114°, after recrystallization from heptane.

EXAMPLE 2

2-[(2-Amino-4-chlorophenyl)thio]-5-diethylsulfanoylbenzyl Alcohol a. Ethyl 2-[(2-Amino-4-chlorophenyl)thio]-5-diethylsulfamoylbenzoate Under nitrogen, to a solution of 63.8 g of ethyl 2-chloro-5-diethylsulfamoylbenzoate and 32.0 g of 2-amino-4-chlorobenzenethiol in 100 ml of ethanol is added in 0.33 hour a solution of 13.6 g of sodium ethoxide in 200 ml of ethanol. The mixture is stirred and heated under reflux for 2 hours, cooled, and the solid filtered, dried, and recrystallized from 2-propanol to give about 70.7 g of ethyl 2-[(2-amino-4-chlorophenyl)thio]5-diethylsulfamoylbenzoate.

b. 2-[(2-Amino-4-chlorophenyl)thio]-5-diethylsulfamoylbenzyl alcohol

To 6.2 g of aluminum hydride in 150 ml of diethyl ether, cooled in ice, is added dropwise a solution of 44.3 g of the produce from (a) in 500 ml of diethyl ether. When the addition is complete, the mixture is heated to reflux, heated under reflux for 25 minutes, cooled and worked up as in Example 1 to give about 33.7 g of 2-[(2-amino-4-chlorophenyl)thio]-5-diethylsulfamoylbenzyl alcohol after recrystallization from cyclohexane.

EXAMPLE 3

2-[(2-Amino-4 -trifluoromethyl)phenyl]thiobenzyl Alcohol a. Methyl 2-[(2-Amino-4-(trifluoromethyl)phenyl)-thio]benzoate A nitrogen-diffused mixture of 193.0 g of 2-amino-4-(trifluoromethyl)benzenethiol, 229.0 g of methyl o-bromobenzoate, 138.0 g of anhydrous potassium carbonate, and 500 ml of N,N-dimethylformamide is warmed at 90°–95°for 6 hours with stirring. The hot mixture is filtered and the filtrate is concentrated to dryness in vacuo. The residual solid is stirred with 250 ml of water, filtered, air-dried and recrystallized from heptane to give about 293.9 g of methyl 2-amino-4-(trifluoromethyl)phenyl)thio]benzoate.

b. 2-[(2-Amino-4-trifluoromethyl)phenyl]thiobenzyl Alcohol

A solution of 7.6 g of lithium aluminum hydride in 150 ml of dry tetrahydrofuran, cooled by means of an ice bath is treated, while stirred, with a solution of 34.1 g of the product from (a) in 250 ml of dry tetrahydrofuran. The addition requires 1 hour. The ice bath is removed, the mixture is heated to reflux, heated under reflux for 0.5 hour, cooled to 5° by means of an ice bath, and treated dropwise with 10 ml of water. Workup as in Example 1 gives about 27.3 g of the above named product, after recrystallization from methylcyclohexane.

EXAMPLE 4

2-[(2-Aminophenyl)thio]-5-methoxybenzyl Alcohol a. Ethyl 2-[(2-Aminophenyl)thio]-5-methoxybenzoate A suspension of 138.0 g of anhydrous potassium carbonate in 500 ml of N,N-dimethylacetamide is diffused with nitrogen for 1 hour. To this suspension, at 20°, is added 125.0 g of o-aminobenzenethiol and 259.0 g of ethyl 2-bromo-5-methoxybenzoate, the mixture is heated to 90°–95°, and kept at this temperature for 4 hours. Workup as in Example 3 gives about 326.2 g of 2-[(2-aminophenyl)thio]-5-methoxybenzoate after recrystallization from Shellysolve E.

b. 2-[(2-Aminophenyl)thio]-5-methoxybenzyl Alcohol

To s solution of 11.4 g of lithium aluminum hydride in 225 ml of dry dioxane is added, at 5°, a solution of 45.5 g of the product from (a) in 250 ml of dry dioxane. Subsequent to the addition, the mixture is heated to 65°, maintained at 65° for 0.5 hour, cooled to 5°, and treated dropwise with 20 ml of water. Workup as in Example 1 give about 39.6 g of a solid that is recrystallized from cyclohexane to give about 32.3 g of 2-[(2-aminophenyl)thio]-5-methoxybenzyl alcohol.

EXAMPLE 5

2-[(2-Amino-5-(methoxy)phenyl)thio]-3-methoxybenzyl Alcohol a. Ethyl 2-[(2-Amino-5-(methoxy)phenyl)thio]-3-methoxybenzoate To a solution of 156.0 g of 2-amino-5-methoxybenzenethiol and 259.0 g of ethyl 2-bromo-3-methoxybenzoate in 1 l of 2-propanol is added dropwise a solution of 54.0 g of sodium methoxide in 500 ml of absolute ethanol. Following the addition, the mixture is heated under reflux with stirring, kept at reflux for about 8 hours, cooled to 20° and poured into 2 l of ice water. The precipitated solid is filtered, washed with water, dried, and recrystallized from heptane to give ethyl 2-[(2-amino5-(methoxy)phenyl)thio]-3-methoxybenzoate.

b. 2-[(2-Amino-5-(methoxy)phenyl)thio]-3-methoxybenzyl Alcohol

By substituting 33.4 g of the product from (a) for ethyl 2-[(2-amino-4-chlorophenyl)]-5-diethylsulfamoylbenzoate in Example 2b, there is obtained about 25.6 g of 2-[(2-amino-5-(methoxy)phenyl)thio]-3-methoxybenzyl alcohol, after recrystallization from heptane.

EXAMPLES 6–15

By employing the procedures described in the above Examples, but substituting equivalent amounts of the reactants in columns A and B, there are obtained the products shown in column C.

| Example | Column A | Column B | Column C |
|---|---|---|---|
| 6 | 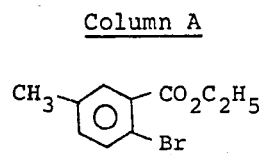 | 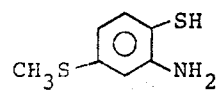 | 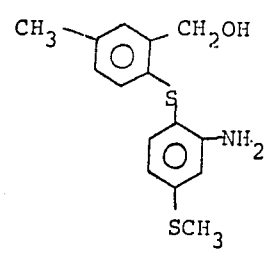 |
| 7 | 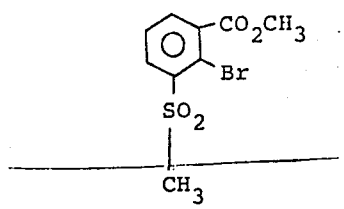 | 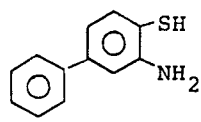 | 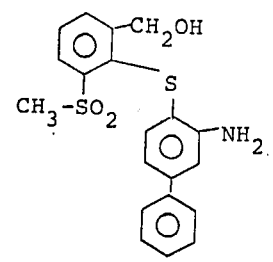 |
| 8 | 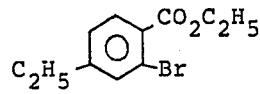 | 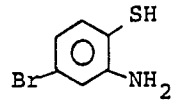 | 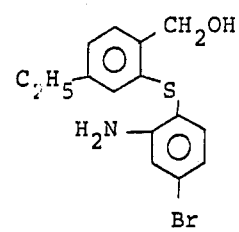 |
| 9 | 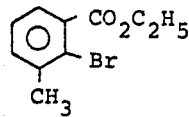 | 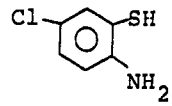 | 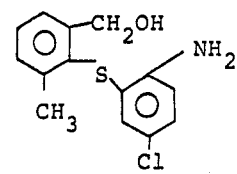 |
| 10 | 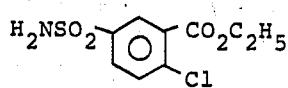 | 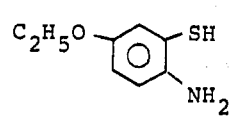 | 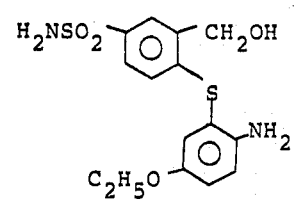 |
| 11 | 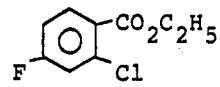 | 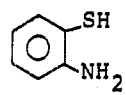 | 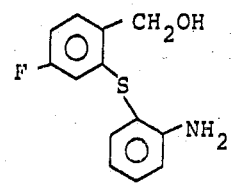 |

| Example | Column A | Column B | Column C |
|---|---|---|---|
| 12 | 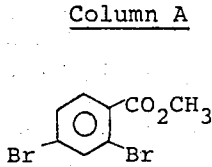 | 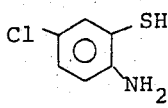 | 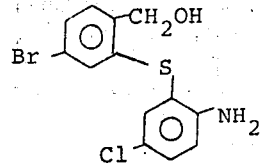 |
| 13 | 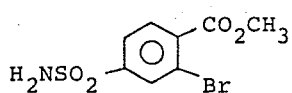 | 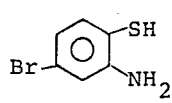 | 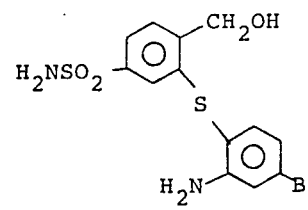 |
| 14 | 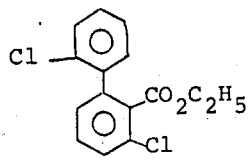 | 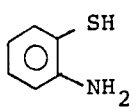 | 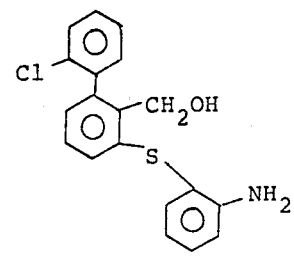 |
| 15 | 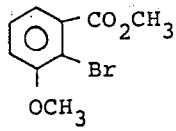 | 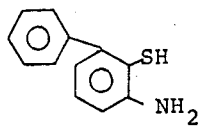 | 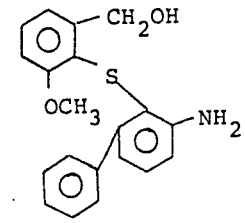 |

EXAMPLE 16

Cream Formulation

| Ingredients | Percent |
|---|---|
| 2-[(2-Amino-4-chlorophenyl)thio]-benzyl alcohol, micropulverised | 0.1–10.0 |
| Propylene glycol | 1–50 |
| Cream base* sufficient to make | 100 |

| *Cream base | Percent |
|---|---|
| Glyceryl monostearate NF XII | 0.4 |
| Cetyl alcohol | 2.2 |
| Myristyl stearate | 5.6 |
| Isopropyl palmitate | 2.2 |
| Tween 60 | 3.3 |
| Propylene glycol | 15 |
| Anti-oxidant (propyl gallate) | qs |
| Aqueous buffer (pH 4–7) qs to | 100 |

The ingredients are mixed according to standard pharmaceutical procedures.

EXAMPLE 17

Anhydrous Cream Formulation

| Ingredients | Percent |
|---|---|
| 2-[(2-Amino-4-chlorophenyl)thio]-benzyl alcohol, micropulverized | 0.1–10.0 |

-continued

| Ingredients | Percent |
|---|---|
| Propylene glycol | 5–70 |
| Cetyl alcohol | 20–30 |
| Polyethylene glycol 6000 | 5–10 |

The ingredients are mixed according to standard pharmaceutical procedures.

EXAMPLE 18

Lotion Formulation

| Ingredients | Percent |
|---|---|
| 2-[(2-Amino-4-chlorophenyl)thio]-benzyl alcohol, micropulverized | 0.1–10.0 |
| Propylene glycol | 5.0 |
| Anti-oxidant | qs |
| Lotion Base* sufficient to make | 100.0 |

| *Lotion Base | Percent |
|---|---|
| Cetyl alcohol | 3.16 gm |
| Stearyl alcohol | 0.211 gm |
| Span 40 | 0.526 gm |
| Propylene glycol | 4.74 gm |
| Tween 20 | 2.32 gm |
| Antifoam AF emulsion | 0.0105 gm |
| Methyl paraben | 0.211 gm |
| Propyl paraben | 0.0211 gm |
| Purified water sufficient to make | 100.0 gm |

EXAMPLE 19

Plastibase Ointment Formulation

| Ingredient | Percent |
|---|---|
| 2-[(2-Amino-4-chlorophenyl)thio]-benzyl alcohol, micropulverized | 0.1–10.0 |
| Plastibase* sufficient to make | 100.0 |

| *Plastibase | Per 100.0 gm |
|---|---|
| Polyethylene Resin | 5.0 gm |
| Mineral Oil, heavy | 95.0 gm |

The ingredients are mixed according to standard pharmaceutical procedures.

EXAMPLE 20

Aerosol Spray Formulation

| Ingredients | Percent |
|---|---|
| 2-[(2-Amino-4-chlorophenyl)thio]-benzyl alcohol, micropulverized | 0.1–10.0 |
| Isopropyl myristate | 4.0 |
| Alcohol, anhydrous | 5.0 |
| Freon 12 | 9.0 |
| Freon 114 | 81.0 |

The ingredients are mixed according to standard pharmaceutical procedures.

EXAMPLE 21

Dusting Powder Formulation

| Ingredients | Percent |
|---|---|
| 2-[(2-Amino-4-chlorophenyl)thio]-benzyl alcohol, micropulverized | 0.1–10.0 |
| Talc, U.S.P. | 99.0 |

The ingredients are mixed according to standard pharmaceutical procedures.

EXAMPLE 22

Gel Formulation

| Ingredients | Percent |
|---|---|
| 2-[(2-Amino-4-chlorophenyl)thio]-benzyl alcohol, micropulverized | 0.1–10.0 |
| Carbopol 940 | 0.65 |
| Triethanolamine | 1.5 |
| Buffer, pH 4–6, sufficient to make | 100.0 |

The ingredients are mixed according to standard pharmaceutical procedures.

What is claimed is:

1. A compound of the formula:

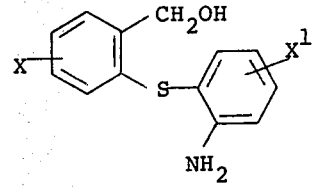

wherein X is selected from the group consisting of hydrogen, chlorine, and methoxy and $X^1$ is selected from the group consisting of chlorine and trifluoromethyl; and pharmaceutically acceptable acid addition salts thereof.

2. The compound of claim 1 having the formula:

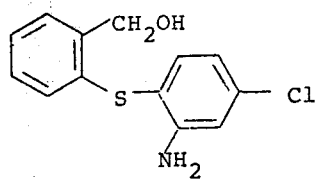

3. The compound of claim 1 having the formula:

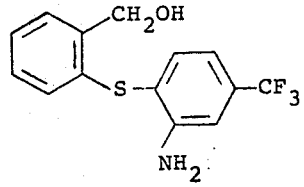

* * * * *

UNITED STATES PATENT AND TRADEMARK OFFICE
CERTIFICATE OF CORRECTION

PATENT NO. : 3,927,093
DATED : December 16, 1975
INVENTOR(S) : HARRY LOUIS YALE

It is certified that error appears in the above-identified patent and that said Letters Patent are hereby corrected as shown below:

Col. 1, line 45, "$Cf_3$" should read --$CF_3$--.

Col. 3, line 53, "produce" should read --product--.

Col. 4, line 65, "amino5" should read --amino-5--.

Signed and Sealed this eighteenth Day of May 1976

[SEAL]

Attest:

RUTH C. MASON
Attesting Officer

C. MARSHALL DANN
Commissioner of Patents and Trademarks